(12) United States Patent
Mann et al.

(10) Patent No.: US 9,464,852 B2
(45) Date of Patent: Oct. 11, 2016

(54) PUSH-FIT CONNECTOR

(71) Applicant: NORMA GERMANY GMBH, Maintal (DE)

(72) Inventors: Stephan Mann, Biebergemuend (DE); Knut Seibel, Altenstadt (DE); Patrick Semmel, Linsengericht (DE)

(73) Assignee: NORMA GERMANY GMBH, Maintal (DE)

( * ) Notice: Subject to any disclaimer, the term of this patent is extended or adjusted under 35 U.S.C. 154(b) by 294 days.

(21) Appl. No.: 14/021,499

(22) Filed: Sep. 9, 2013

(65) Prior Publication Data
US 2014/0069621 A1 Mar. 13, 2014

(30) Foreign Application Priority Data
Sep. 10, 2012 (EP) .................................... 12006361

(51) Int. Cl.
F16L 53/00 (2006.01)
F28F 1/00 (2006.01)
F24H 1/10 (2006.01)
F24H 1/14 (2006.01)

(52) U.S. Cl.
CPC ............... *F28F 1/00* (2013.01); *F16L 53/001* (2013.01); *F16L 53/008* (2013.01); *F24H 1/101* (2013.01); *F24H 1/142* (2013.01)

(58) Field of Classification Search
CPC ....... F16L 53/001; F16L 53/008; F28F 1/40; F28D 7/163; F28D 2001/0253; F28D 2001/0266; F24H 1/101; F24H 1/121; F24H 1/14; F24H 1/142; F24H 1/162
See application file for complete search history.

(56) References Cited

U.S. PATENT DOCUMENTS

| | | | | |
|---|---|---|---|---|
| 2,343,049 A * | 2/1944 | Fassinger, Sr. | ........ | B64D 15/02 165/154 |
| 4,423,311 A * | 12/1983 | Varney, Sr. | ............... | E03B 7/14 138/33 |
| 4,883,943 A * | 11/1989 | Davis | ................... | F02M 31/125 123/549 |
| 5,182,792 A * | 1/1993 | Goncalves | ............ | E21B 17/203 166/60 |
| 5,558,069 A * | 9/1996 | Stay | ........................ | F02M 31/10 123/541 |

(Continued)

FOREIGN PATENT DOCUMENTS

| | | |
|---|---|---|
| DE | 20 2008 005790 | 9/2008 |
| DE | 10 2007 036533 | 2/2009 |

(Continued)

OTHER PUBLICATIONS

Korea Office Action conducted in counterpart Korea Appln. No. 10-2013-0107393 (Sep. 24, 2014) (w/ English translation).

(Continued)

*Primary Examiner* — Kevin Murphy
(74) *Attorney, Agent, or Firm* — Greenblum & Bernstein, P.L.C.

(57) ABSTRACT

Push-fit connector and method of heating a fluid in the push-fit connetor. The push-fit connector includes a housing, an accommodation space and a connecting piece connected by a channel, a heating zone located in an inside of the channel and a heat-conducting element being arranged between the heating zone and the accommodation space.

18 Claims, 1 Drawing Sheet

(56) References Cited

U.S. PATENT DOCUMENTS

| | | | | |
|---|---|---|---|---|
| 5,859,953 A | * | 1/1999 | Nickless | F16L 53/008 138/33 |
| 2005/0241632 A1 | * | 11/2005 | Alfoldi | F16L 53/008 126/116 R |
| 2007/0176418 A1 | | 8/2007 | Frogneborn et al. | |
| 2009/0034949 A1 | * | 2/2009 | Sawada | F16L 53/008 392/488 |
| 2009/0308466 A1 | * | 12/2009 | Haeberer | F01N 3/2066 137/334 |
| 2010/0193530 A1 | * | 8/2010 | Leonard | F01N 3/20662 220/694 |
| 2010/0253067 A1 | | 10/2010 | Isenburg et al. | |
| 2011/0025043 A1 | | 2/2011 | Garnier et al. | |
| 2011/0073585 A1 | | 3/2011 | Sinault et al. | |

FOREIGN PATENT DOCUMENTS

| | | |
|---|---|---|
| DE | 10 2008 018658 | 10/2009 |
| EP | 1 070 1642 | 1/2000 |
| FR | 2 924 786 | 6/2009 |
| JP | 55-155975 | 10/1980 |
| JP | 2004-239412 | 8/2004 |
| JP | 2009-002424 | 1/2009 |
| JP | 2009-030771 | 2/2009 |
| JP | 2009-168119 | 7/2009 |
| JP | 2009-270659 | 11/2009 |
| JP | 2010-535313 | 11/2010 |
| JP | 2011-506889 | 3/2011 |
| WO | 02/38426 | 5/2002 |
| WO | 2009/013342 | 1/2009 |
| WO | 2009/103869 | 8/2009 |

OTHER PUBLICATIONS

Japan Office Action conducted in counterpart Japan Appln. No. 2013-176939 (Aug. 19, 2014) (w/ English translation).

* cited by examiner

PUSH-FIT CONNECTOR

CROSS-REFERENCE TO RELATED APPLICATIONS

The present application claims priority under 35 U.S.C. §119 of European Patent Application No. 12 006 361.5, filed Sep. 10, 2012, the disclosure of which is expressly incorporated by reference herein in its entirety.

BACKGROUND OF THE INVENTION

1. Field of the Invention

Embodiments of the invention relate to a push-fit connector with a housing that has an accommodation space, a connecting piece and a channel connecting the accommodation space and the connecting piece, wherein a heating zone is provided in the inside of the channel.

2. Discussion of Background Information

Embodiments of the invention are explained below on the basis of a fluid line that is used in order to transport urea from a supply container to a point of use. Urea is used in diesel engines in order to reduce the emission of nitrogen oxides.

The connection between the fluid line and the supply container and the connection between the fluid line and the point of use are often produced using a push-fit connector of the type named at the outset. A push-fit connector of this type can also be used in order to connect several line sections to one another. The push-fit connector has a connecting piece that can slide onto a line, e.g., a hose or a tube. At the opposite end, an accommodation space is provided so that a nozzle of the supply container or a nozzle of the point of use can be inserted. A channel is provided between the accommodation space and the connecting piece in order to enable a flow of fluid through the push-fit connector.

For heating, a heating element is led through the connecting piece, which heating element is often also led through the line in order to heat the fluid located there as needed. However, it is often also necessary to lead the heating element out of the push-fit connector in order to produce the required energy supply connections to the heating element, normally electric connections.

Urea loses its flowability at a temperature of approximately minus 11° C. There are therefore regulations that govern the period of time in which a urea line must be defrosted so that it can be used in a motor vehicle. The longer the defrosting operation lasts, the longer nitrogen oxides are released into the environment.

SUMMARY OF THE INVENTION

Embodiments of the invention are directed to enabling a quick heating of a fluid line with a push-fit connector.

According to embodiments, a push-fit connector of the type described at the outset also includes a heat-conducting element arranged between the heating zone and the accommodation space.

A weak point during the defrosting of a line using the known push-fit connector of the type described at the outset is the fluid volume that is arranged in the push-fit connector. It is relatively difficult to arrange a heating element that can directly heat this fluid volume. According to embodiments of the invention, the heating can now be performed in a different manner. Heat is removed from the heating zone and is conducted into the accommodation area with the aid of the heat-conducting element. A heat-conducting element merely needs to be capable of transporting heat with the lowest possible losses. It is not necessary that the heat-conducting element itself can produce heat. The structure of a heat-conducting element and the design of a push-fit connector with this heat-conducting element is very simple, as the heat-conducting element itself requires no connections via which, e.g., electric energy can be fed.

Preferably, the heat-conducting element extends into the accommodation area. Thus, the heat is not only transported up to the accommodation space by the heat-conducting element, but also even into the accommodation space. A relatively large length is thus made available over which the heat-conducting element can dissipate heat to the fluid in the accommodation space.

Preferably, a sealing assembly is arranged in the accommodation space and the heat-conducting element projects through the sealing assembly. The sealing assembly is used in order to create a tight connection between the push-fit connector and a nozzle that is inserted into the accommodation space. If the heat-conducting element projects through the sealing arrangement, it is ensured that the heat-conducting element also projects into the nozzle. When the connection between the push-fit connector and the nozzle is produced, then the heat-conducting element also projects into the nozzle and can accordingly also heat the fluid located there.

Preferably, the heat-conducting element has an attachment section that is inserted into the channel. The attachment section is used in order to attach the heat-conducting element in the housing. For this purpose, it is attached in the channel.

Preferably, the heat-conducting element has along its length an outer dimension that is maximally as large as the inner dimension of the channel. The inner dimension of the channel corresponds in many cases to the inner dimension of the nozzle. Accordingly, it can be assumed based on this dimensioning that the nozzle can be led unproblematically over the heat-conducting element when the nozzle is inserted into the accommodation space.

Preferably, the heat-conducting element is held in the channel in a pinched or friction-fit manner. In this manner, the heat-conducting element is thus sufficiently attached in the housing. Additional attachment devices are not necessary.

Preferably, the heat-conducting element has a heat-dissipation section, which is embodied or formed as a cylindrical sleeve that surrounds an inner space. In this way, the cylindrical sleeve can be at least partially based on a circular cylinder. However, any other cross sections are possible. By way of a cylindrical sleeve, it is ensured that heat can be emitted in two directions, i.e., radially outwards and radially inwards into the inner space. Thus, the surface via which the heat can be transferred is kept large in a simple manner.

Preferably, the heat-conducting element has at least one blade that is directed into the inner space. This blade forms an additional surface via which the heat from the heat-conducting element can be transferred to the fluid.

Preferably, the cylindrical sleeve has an elongate slit. By this slit, fluid can move outward, i.e., out of the inner space, or inwards, i.e., into the inner space, depending on the flow direction of the fluid. Thus, the cylindrical sleeve does not form a blockage for the fluid in a radial direction. Thus, fluid can without difficulty be located outside and inside the cylindrical sleeve, which improves the heat transfer to the fluid.

Preferably, the blade connects to an edge of the nozzle. In other words, the blade starts at the edge of the slit and projects into the inner space. This is a particularly simple embodiment of the heat-conducting element.

Preferably, the heat-conducting element is formed from a metal, in particular aluminum, copper or brass. Metal is a relatively good heat conductor. A metal can be chosen that it is unproblematically compatible with the fluid that is to be heated. The heating element can also be formed from several metals, e.g., the heat-conducting element can be embodied or formed in a multilayer or coated manner. Thus, silver-plated copper, e.g., can also be used.

Preferably, a heating element is arranged in the heating zone and the heat-conducting element is in heat-conducting contact with the heating element. This improves the heat transfer. The heat-conducting element can in any case take on the temperature of the heating element where it is in heat-conducting contact with the heating element, and this temperature is normally higher than the temperature of the fluid in the heating zone at a certain distance from the heating element. This further improves the heat transfer from the heating element into the accommodation space.

In embodiments, it is preferred that the heat-conducting element is connected to the heating element in a pinched or friction-fit manner. When the heat-conducting element is connected to the heating element in a pinched manner, it bears against the heating element with a certain tension. This improves the heat transfer between the heating element and the heat-conducting element.

Preferably, a ramp element is arranged in the channel along which the heating element is led out of the channel, and the heat-conducting element has a recess which accommodates the ramp element. In this way, the heat-conducting element can be led around the ramp element so that, despite the ramp element, it can be inserted relatively far into the channel and preferably can be connected to the heating element in a pinched or friction-fit manner.

Preferably, the housing has a movable locking geometry and the heat-conducting element projects into a region in which the locking geometry is arranged. The locking geometry serves to secure the above-mentioned nozzle in the accommodation space and, possibly after a movement of the locking geometry, release it so that the push-fit connector can be pulled off of the nozzle. Because the locking geometry acts on the nozzle, it is ensured that the heat-conducting element can project into the inside of the nozzle if it projects into the region in which the locking geometry is arranged. The heating of the inside of the nozzle can then also be ensured if a sealing assembly is arranged at a different position and the heat-conducting element does not extend into the region of the sealing assembly. With a locking geometry of this type, it is for example not possible to arrange a heating device, for example a heating wire, outside on the housing in order to heat the accommodation space.

Embodiments of the invention are directed to a push-fit connector. The push-fit connector includes a housing, an accommodation space and a connecting piece connected by a channel, a heating zone located in an inside of the channel and a heat-conducting element being arranged between the heating zone and the accommodation space.

According to embodiments of the invention, the heat-conducting element may be structured and arranged to extend into the accommodation space. Moreover, a sealing assembly can be arranged in the accommodation space. The heat-conducting element can be structured and arranged to project through the sealing assembly.

In accordance with other embodiments, the heat-conducting element may include an attachment section insertable into the channel. The heat-conducting element may have along its length an outer dimension that is maximally as large as an inner dimension of the channel. Further, the heat-conducting element can be held in the channel in a friction-fit manner.

According to still other embodiments of the instant invention, the heat-conducting element may include a heat-dissipation section formed as a cylindrical sleeve surrounding an inner space. The heat-conducting element may have at least one blade which is directed into the inner space. Further, the cylindrical sleeve can include an elongated slit. The heat-conducting element may have at least one blade directed into the inner space and the blade is attached to an edge of the slit.

In accordance with still further embodiments, the heat-conducting element can be formed from a metal. The metal can include one of aluminum, copper or brass.

According to further embodiments, a heating element can be arranged in the heating zone and the heat-conducting element may be arranged in heat-conducting contact with the heating element. The heat-conducting element may be connected to the heating element in a friction-fit manner. Moreover, a ramp element can be arranged in the channel. The heating element can be guided out of the channel along the ramp element, and the heat-conducting element may have a recess that accommodates the ramp element.

In embodiments, the housing can include a movable locking geometry and the heat-conducting element can project into a region in which the locking geometry is arranged.

Embodiments of the invention are directed to a method of heating a fluid in the above-described push-fit connector. The method includes heating the heating zone inside the channel and conducting heat from the heating zone toward the accommodation space through the channel.

In accordance with still yet other embodiments of the present invention, the heat can be conducted toward the accommodation space via a heat-conducting element having a cylindrical outer contour. Further, heat conducted along the heat-conducting element can move radially inward and radially outward. Additionally, the heating zone may be heated by a heating element extending into the heating zone along a ramp element and the heat-conducting element can be structured to be coupled to Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
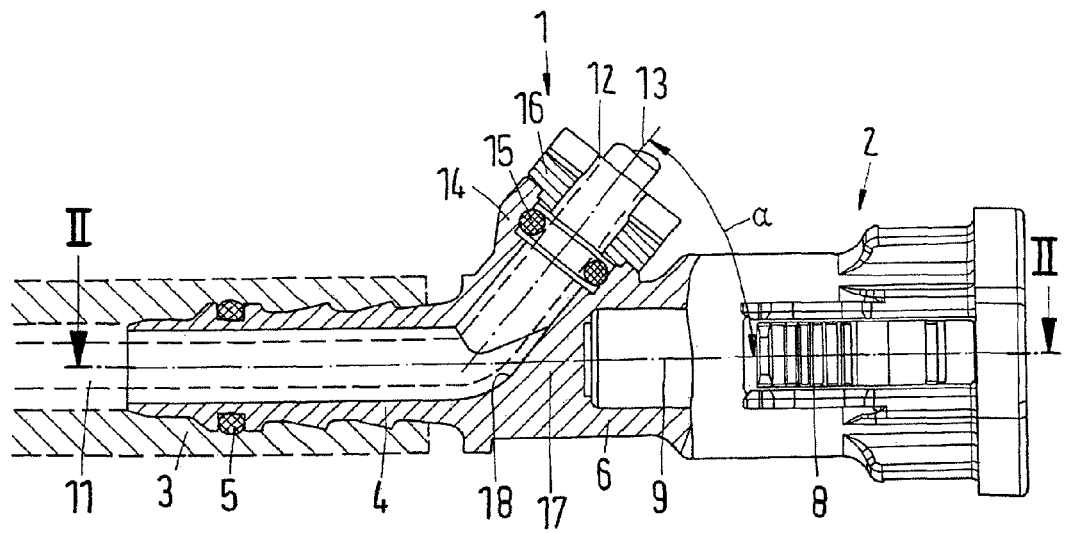
FIG. 1 shows a schematic longitudinal section through a connector with a connected tube, in which a heat-conducting element is omitted for reasons of clarity.

FIG. 1 illustrates a longitudinal section of a heatable fluid line 1 with a push-fit connector 2 and a tube 3. Tube 3 is flexible and can be formed from an extruded plastic or from a hose material. In the following description, a hose is also to fall under the term "tube."

Tube 3 is attached to a connecting piece 4 of the push-fit connector 2 and sealed there by an O-ring 5. Connecting piece 4 has on its outside a Christmas-tree profile. If necessary, tube 3 can also be secured on connecting piece 4 with the aid of a tensioning element, e.g., a hose clamp or the like (not shown).

Connecting piece 4 is a component of housing 6. Housing 6 has an accommodation space 7 in which a nozzle, not shown in greater detail, of a supply container, a point of use or another fluid line can be inserted. For locking the nozzle, housing 6 has in the region of accommodation space 7 a locking geometry 8 that can be moved parallel to a longitudinal axis 9 of push-fit connector 2, i.e., axially.

Furthermore, housing 6 has a channel 10 which connects accommodation space 7 and connecting piece 4 to one another.

As can be recognized in FIG. 1, a heating element 11, shown in dashed lines, is arranged in the free cross section of tube 3. In the illustrated embodiment, heating element 11 is embodied or formed as a flexible heating wand, which has at least one heating conductor embedded in an extruded plastic material. Preferably, two heating conductors are provided that are connected to one another at an end remote from push-fit connector 2 so that an electric connection is only necessary at one end of heating element 11. Although heating element 11 is flexible and bendable, it has a certain inherent stiffness so that when tube 3 (with heating element 11 located therein) slides onto connecting piece 4, heating element 11 can then slide into connecting piece 4.

Heating element 11 must be led out of push-fit connector 2 in order to produce the electric connections, which not shown in greater detail. Via these connections, the desired heat output can be introduced into heating element 11. Accordingly, push-fit connector 2 has a heating element outlet channel 12 with a longitudinal axis 13 oriented at an angle α to longitudinal axis 9 of push-fit connector 2. Angle α is greater than 0° and is preferably within a range of 20° to 80°.

Heating element outlet channel 12 is arranged in a connector 14, which is directed to longitudinal axis 9 of push-fit connector 2 at angle α. An O-ring 15 is provided in connector 14. O-ring 15 bears against heating element 11 in a sealing manner and prevents an escape of fluid from heating element outlet channel 12. O-ring 15 is also secured in heating element outlet channel 12 with the aid of a plug 16.

In channel 10, a ramp element 17 is arranged which is embodied or formed in one piece with housing 6. Ramp element 17 has a guide surface 18, which is embodied or formed in a curved, i.e., kink-free manner. Guide surface 18 extends from the "underside" of channel 10, i.e., from the side lying opposite heating element outlet channel 12, to heating element outlet channel 12 and continues in a wall of the heating element outlet channel 12. The tip of heating element 11 can thus slide along guide surface 18 without being impeded by steps, kinks, grooves or the like.

A fluid that is located in channel 10 is heated where heating element 11 is arranged in channel 10. This region is also referred to as the "heating zone." The heating zone extends among other things on both sides of ramp element 17.

Figure 3:
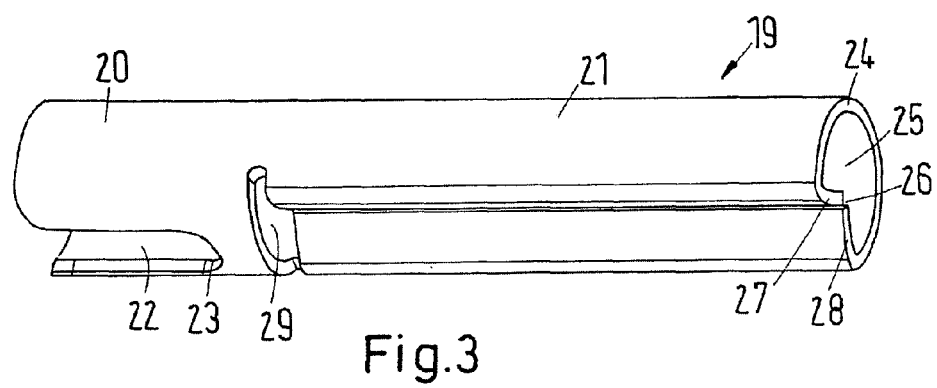
FIG. 3 shows a perspective representation of a heat-conducting element.

Push-fit connector 2 has a heat-conducting element 19, which is shown in an enlarged perspective view in FIG. 3.

Figure 2:
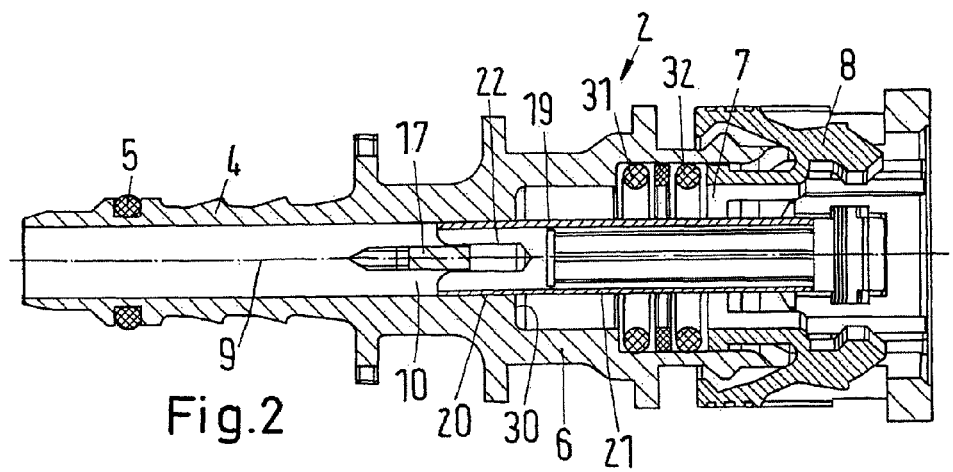
FIG. 2 shows a cross section 1141 according to FIG. 1 with a heat-conducting element.

For reasons of clarity, heat-conducting element 19 is not shown in FIG. 1 and heating element 11 is not shown in FIG. 2.

Heat-conducting element 19 is formed from a metal, in particular a suitably heat-conducting metal, such as aluminum, copper or brass.

Heat-conducting element 19 has an attachment section 20 which is inserted into channel 10. Attachment section 20 is held in channel 10 in a pinched or friction-fit manner.

Furthermore, heat-conducting element 19 has a heat-dissipation section 21 that projects into accommodation space 7.

Expressed in a simplified manner, heat-conducting element 19 is embodied or formed as a cylindrical sleeve having an outer diameter approximately as large as the inner diameter of channel 10. Heat conducting element 19, expressed in a simplified manner, has the shape of a circular cylinder. However, it is to be understood that a circular cross section is not necessary. Instead, other cross sections can be provided.

Attachment section 20 has a U-shaped recess 22 that accommodates ramp element 17. Heat-conducting element 19 is inserted far enough into channel 10 that an end 23 of recess 22 comes to bear against ramp element 17, as shown in FIG. 2.

In a manner not shown in greater detail, attachment section 20 has, diametrically opposed to recess 22, a recess not further recognizable in FIG. 3, which recess is matched to the outer circumference of heating element 11 so that attachment section 20 can be clamped onto heating element 11 by this recess. Heat-conducting element 19 is then connected in a heat-conducting manner to heating element 11 so that heat from heating element 11 can be transferred to heat-conducting element 19. Heat-conducting element 19 then transports this heat into accommodation space 7.

Heat-dissipation section 21 has a wall 24 which surrounds an inner space 25. Wall 24 has in a circumferential direction a slit 26 which runs parallel to the longitudinal axis 9 of push-fit connector 2. Through slit 26, fluid can move from inner space 25 into accommodation space 7 or from accommodation space 7 into inner space 25. Furthermore, wall 24 has two blades 27, 28 directed inwardly into inner space 25 that contribute to an increase in the surface of heat-dissipation section 21.

Because of this shape of heat-dissipation section 21, it is possible that fluid is located both inside heat-conducting element 19, i.e., in inner space 25 and also outside heat-conducting element 19, i.e., between heat-conducting element 19 and housing 6. Thus, should this fluid be frozen and a heating become necessary, heat-conducting element 19 can guide heat from the heating zone into accommodation space 7 and dissipate this heat radially inwards and radially outwards so that the fluid can be defrosted relatively quickly.

Attachment section 20 has a front-face opening 29 where attachment section 20 turns into heat-dissipation section 21. Through opening 29, the fluid from channel 10 can directly move into accommodation space 7. Accommodation space 7 extends up to a diameter decrease 30 of housing 6. As can be recognized in FIG. 2, attachment section 20 can still slightly extend into accommodation space 7.

In accommodation space 7, a sealing assembly with two O-rings 31, 32 is provided, which bears in a sealing manner against a nozzle inserted into accommodation space 7. This nozzle is likewise not shown for reasons of clarity. Heat-conducting element 19 is led through the sealing assembly with O-rings 31, 32 so that it is ensured that heat-conducting element 19 projects into the nozzle.

Heat-conducting element 19 extends into accommodation space 7 up to locking geometry 8. Because locking geometry 8 acts on a region of the nozzle that is at a distance from the end of the nozzle, it is ensured that heat-conducting element 19 projects into the nozzle.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A push-fit connector comprising:
    a housing;
    an accommodation space and a connecting piece connected by a channel;
    a heating zone located in an inside of the channel; and
    a heat-conducting element being arranged between the heating zone and the accommodation space,
    wherein the heat-conducting element comprises a heat-dissipation section formed as a cylindrical sleeve surrounding an inner space, and the cylindrical sleeve comprises an elongated slit structured and arranged so that a fluid located within the inner space is movable radially outward through the elongated slit and a fluid located outside of the inner space is movable radially inwardly through the elongated slit.

2. The push-fit connector according to claim 1, wherein the heat-conducting element is structured and arranged to extend into the accommodation space.

3. The push-fit connector according to claim 2, further comprising a sealing assembly arranged in the accommodation space, wherein the heat-conducting element is structured and arranged to project through the sealing assembly.

4. The push-fit connector according to claim 1, wherein the heat-conducting element comprises an attachment section insertable into the channel.

5. The push-fit connector according to claim 4, wherein the heat-conducting element has along its length an outer dimension that is maximally as large as an inner dimension of the channel.

6. The push-fit connector according to claim 4, wherein the heat-conducting element is held in the channel in a friction-fit manner.

7. The push-fit connector according to claim 1, wherein the heat-conducting element has at least one blade which is directed into the inner space.

8. The push-fit connector according to claim 1, wherein the heat-conducting element has at least one blade directed into the inner space and the blade is attached to an edge of the slit.

9. The push-fit connector according to claim 1, wherein the heat-conducting element is formed from a metal.

10. The push-fit connector according to claim 9, wherein the metal comprises one of aluminum, copper or brass.

11. The push-fit connector according to claim 1, further comprising a heating element arranged in the heating zone and the heat-conducting element being arranged in heat-conducting contact with the heating element.

12. The push-fit connector according to claim 11, wherein the heat-conducting element is connected to the heating element in a friction-fit manner.

13. The push-fit connector according to claim 11, further comprising:
    a ramp element arranged in the channel,
    wherein the heating element is guided out of the channel along the ramp element, and
    wherein the heat-conducting element has a recess that accommodates the ramp element.

14. The push-fit connector according to claim 1, wherein the housing comprises a movable locking geometry and the heat-conducting element projects into a region in which the locking geometry is arranged.

15. A method of heating a fluid in the push-fit connector according to claim 1, comprising:
    heating the heating zone inside the channel; and
    conducting heat from the heating zone toward the accommodation space through the channel.

16. The method according to claim 15, wherein the heat is conducted toward the accommodation space via the heat-conducting element, the heat conducting element having a cylindrical outer contour.

17. The method according to claim 15, wherein the heating zone is heated by a heating element extending into the heating zone along a ramp element and the heat-conducting element is structured to be coupled to the ramp element.

18. A push-fit connector comprising:
    a housing;
    an accommodation space and a connecting piece connected by a channel;
    a heating zone located in an inside of the channel;
    a heat-conducting element being arranged between the heating zone and the accommodation space;
    a heating element arranged in the heating zone and the heat-conducting element being arranged in heat-conducting contact with the heating element; and
    a ramp element arranged in the channel,
    wherein the heating element is guided out of the channel along the ramp element, and
    wherein the heat-conducting element has a recess that accommodates the ramp element.

* * * * *